July 25, 1967  W. A. GEYGER  3,333,192

SECOND HARMONIC MAGNETIC MODULATOR MEASURING SYSTEM

Filed Dec. 24, 1963  8 Sheets-Sheet 1

INVENTOR.
William A. Geyger
BY
ATTORNEY.

July 25, 1967 W. A. GEYGER 3,333,192
SECOND HARMONIC MAGNETIC MODULATOR MEASURING SYSTEM
Filed Dec. 24, 1963 8 Sheets-Sheet 2

INVENTOR.
William A. Geyger
BY
ATTORNEY.

FIG. 5

INVENTOR.
William A. Geyger

July 25, 1967 W. A. GEYGER 3,333,192
SECOND HARMONIC MAGNETIC MODULATOR MEASURING SYSTEM
Filed Dec. 24, 1963 8 Sheets-Sheet 5

INVENTOR.
William A. Geyger
BY
ATTORNEY.

July 25, 1967 W. A. GEYGER 3,333,192
SECOND HARMONIC MAGNETIC MODULATOR MEASURING SYSTEM
Filed Dec. 24, 1963 8 Sheets-Sheet 7

INVENTOR.
William A. Geyger
BY
ATTORNEY.

INVENTOR.
William A. Geyger
BY
ATTORNEY.

United States Patent Office 3,333,192
Patented July 25, 1967

3,333,192
SECOND HARMONIC MAGNETIC MODULATOR
MEASURING SYSTEM
William A. Geyger, 8510 Flower Ave.,
Takoma Park, Md. 20012
Filed Dec. 24, 1963, Ser. No. 333,242
7 Claims. (Cl. 324—117)

The invention described herein may be manufactured and used by or for the Government of the United States of America for governmental purposes without the payment of any royalties thereon or therefore.

This invention relates to magnetic modulators and more particularly to magnetic modulators employing toroidal cores which are periodically saturated by alternating magnetic fields.

In magnetic modulators of conventional design, the problem of zero drift is a major disadvantage. A number of solutions to this problem have been attempted. One of the approaches to the solution of the zero drift problem includes the use of two magnetic fields disposed in perpendicular relationship to each other in a single core. In such cross-field type modulators, a hollow toroidal core is employed having an annular winding within the hollow portion of the core and a toroidal winding disposed externally on the core. The annular winding is connected to an A-C excitation voltage source and the toroidal winding is connected to a D-C signal voltage source. The special split core configuration of the cross-field type modulator is restricted to ferrite core materials which are characterized by permeabilities in the order of 4000 and resistivities up to $10^6$ ohm centimeters. The necessity for the use of ferrite core materials is based upon that neither solid cores nor laminated cores are effective in reducing eddy current losses in two perpendicular directions.

A second opproach to the elimination of zero drift in magnetic modulators involves the use of two equally rated flux components in two equally rated saturable reactor elements in which decoupling is secured between A-C excitation windings and D-C signal windings. Since the twin core type modulator normally uses a filtering circuit for selecting the second harmonic components of the output voltage, and this voltage is applied to a tuned A-C amplifier, a slight mismatch of the core characteristics of the two cores employed, causes a relatively high residual noise output voltage which places stringent requirements on both filter and amplifier circuits in order that these units will perform properly with the presence of this relatively large residual noise voltage.

In the magnetic modulator of the present invention, a single toroidal core with a continuous flux path, that is a core having no air gap, is employed. In the development of a ring core magnetometer, disclosed in copending application, Ser. No. 143,988, filed Oct. 9, 1961, the inventor discovered that a toroidal core which is energized by an A-C winding and placed in a D-C field divides itself magnetically into two equally rated semicircle portions. The application of this principle has now been extended to the magnetic modulator field. In the present invention a single toroidal core having no air gap is employed as a replacement for the conventional twin cores of a conventional type magnetic modulator. A toroidal core having a winding thereon is placed within an A-C magnetic field and a single voltage is applied to the winding on the core. The interaction of the flux produced by the signal voltage and the flux produced by the A-C magnetic field causes a second harmonic voltage to be developed in the core winding. The magnitude of the second harmonic output voltage is proportional to the magnitude of the signal voltage applied to the core winding. In an embodiment of this invention, the A-C magnetic field is provided by placing an air core coil around a toroidal core. Such an arrangement may be considered as an electromagnetic chopper which develops an A-C voltage in the winding of the core which is proportional to the input signal applied to the core winding.

An object of this invention is to provide a magnetic modulator having a single toroidal core.

Another object of this invention is to employ a single ordinary toroidal core in a magnetic modulator.

A further object of this invention is to provide a magnetic modulator in which a single toroidal core is placed within an A-C magnetic field and a signal voltage is applied to a winding on said core.

A still further object of this invention is to provide a magnetic modulator having a minimum zero drift.

A yet further object of this invention is to reduce the residual noise level in a magnetic modulator.

Yet another object is to provide a sensitive modulator for use with very low signal current levels.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
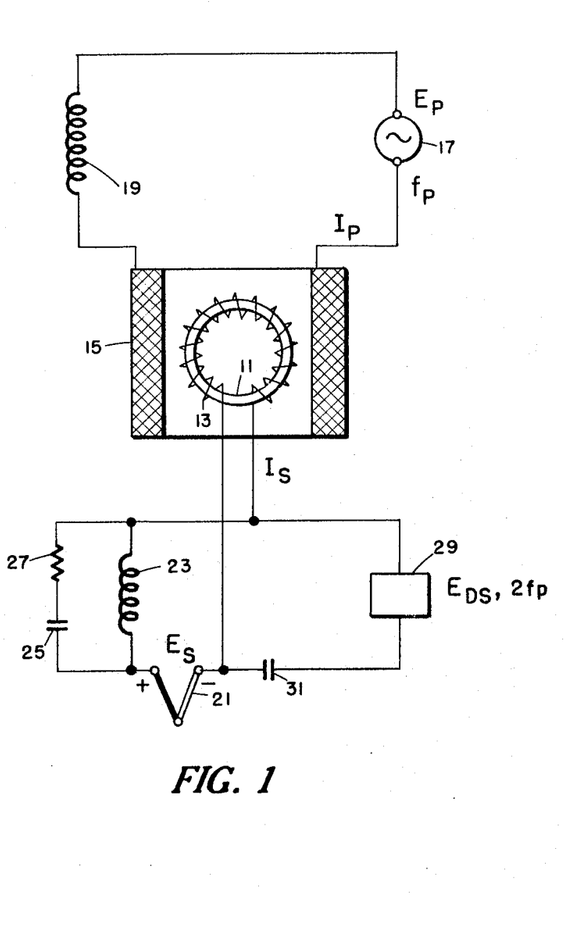
FIG. 1 of the drawings illustrates an embodiment of this invention in which a low impedance signal source is used.

Referring now to FIG. 1 of the drawings, in which an embodiment of the present invention is illustrated, a toroidal core 11 is provided with a winding 13. Core 11 is shown as being placed within air core coil 15. Air core coil 15 is connected to an A-C excitation voltage source 17 through linear inductor 19. A D-C signal voltage source 21, having a voltage $E_S$ and current $I_S$, such as, for example, a thermocouple shown, or a radiation pyrometer, may be connected to winding 13 through linear inductor 23. A series circuit comprising capacitor 25 and resistor 27 are shown connected in parallel to linear inductor 23. A second harmonic detector circuit 29 is connected to winding 13 through capacitor 31.

In operation, an A-C voltage from source 17, having a voltage $E_p$, and a frequency $f_p$, is applied to air core coil 15 to provide an A-C magnetic field about toroidal core 11. At the same time, a D-C signal voltage is applied to winding 13 from D-C signal source 21. The A-C magnetic field caused by the energization of air core coil 15 is of sufficient magnitude to completely saturate toroidal core 11 during a portion of each half-cycle of the A-C voltage source 17. The core will be saturated in one direction during a portion of the positive half-cycle and in the opposite direction during a portion of the negative half-cycle of operation of source 17. The application of this A-C magnetization together with a D-C magnetization of core 11 by a D-C voltage from D-C signal source 21 will cause an A-C voltage in winding 13, $E_{DS}$ which has a frequency of $2f_p$, which is twice that of A-C voltage source 17 in accordance with the principle of second harmonic saturable reactor devices as disclosed in German Patent No. 149,761 issued Mar. 26, 1904 to J. Epstein. The second harmonic voltage thus developed in winding 13 is applied to the second harmonic detector circuit 29 wherein the magnitude of the second harmonic voltage is determined as is illustrated in more detail hereinafter.

During the portion of time or of the time intervals that core 11 is saturated, the permeability of the core will be unity and the core will appear to winding 13 as an air core. During the time portions or intervals of the half-cycles in which core 11 is unsaturated, however, it will have the normal high permeability. The magnitude of the second harmonic voltage developed in winding 13 will be proportional to the signal current applied to the winding.

With a low impedance D-C signal source such as a thermocouple or a radiation pyrometer for example, as illustrated in FIG. 1, a tuned network including linear inductor 23, capacitor 25, and resistor 27, is employed to provide a high impedance to the second harmonic current flowing in winding 13.

Noise voltages at zero signal level due to mutual inductance between winding 13 and coil 15 may be reduced to a minimum by adjusting the position of core 11 with respect to coil 15.

Figure 2:
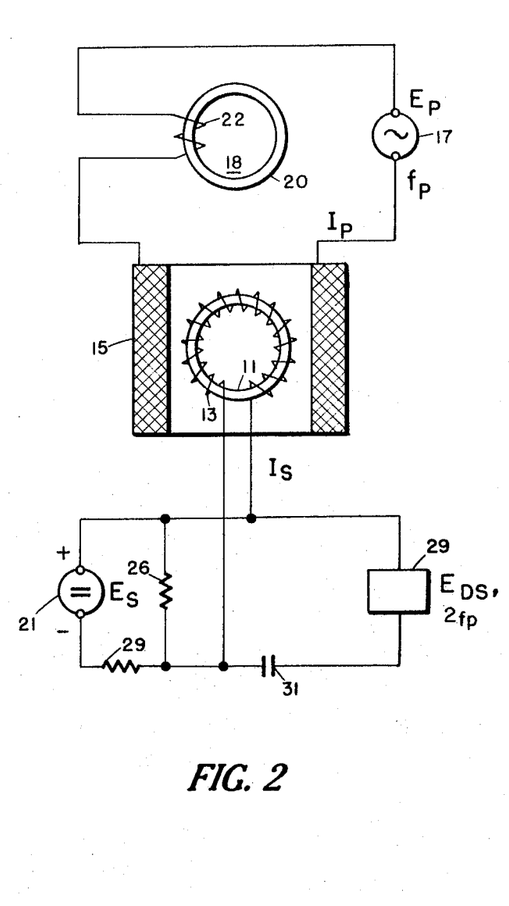
FIG. 2 of the drawings illustrates an embodiment of this invention in which a high impedance signal source is used.

Referring now to FIG. 2 of the drawings, an embodiment of the modulator of this invention is shown in which a saturating reactor is used to produce peaked voltage pulses. Toroidal core 11 is supplied with a winding 13 and placed within an air core coil 15. An A-C voltages source 17 having a voltage $E_p$ and a frequency $f_p$, is connected to coil 15 through saturating or saturable reactor 18. Saturating reactor 18 is comprised of core 20 and saturating winding 22. A D-C signal source 21 is shown connected to winding 13 through resistor 29. Resistor 26 is connected across the terminals of winding 13. A second harmonic detector circuit 29 having an output voltage $E_{DS}$ and a frequency $2f_p$, is connected at winding 13 through capacitor 31. Capacitor 31 acts as a blocking capacitor to keep D-C signal current from flowing in the second harmonic detector circuit. In FIG. 2, the D-C signal source 21 is a high impedance source in which resistor 29 replaces the tuned circuit of FIG. 1. Damping resistor 26 is connected across winding 13 to improve the wave form of the second harmonic output voltage.

Figure 3:
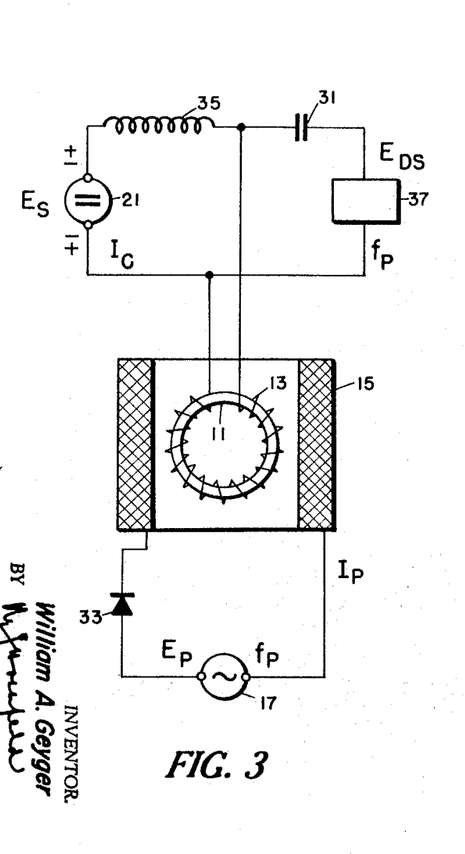
FIG. 3 of the drawings illustrates a half-wave fundamental magnetic modulator of this invention.

Referring now to FIG. 3 of the drawings in which an embodiment of the instant invention utilizes the fundamental frequency technique is illustrated, a toroidal core 11 is provided with a winding 13. Core 11 is shown as placed within air core coil 15. Air core coil 15 is connected to an A-C excitation voltage source 17, having a voltage $E_P$ and a frequency $f_p$, through diode 33. A D-C signal voltage source 21, having a voltage $E_S$ and current $I_C$, is connected to winding 13 through linear inductor 35. Winding 13 is connected to an output or detector circuit 37 through capacitor 31. Capacitor 31 acts as a blocking capacitor to keep the D-C signal from entering the output or detector circuit.

In operation, when the modulator is energized by the application of voltage $E_P$, with a current $I_P$ from A-C source 17 through rectifier 33 provides a saturating magnetic field about core 11 during alternate half-cycles of A-C source 17. For example, core 11 may be saturated by the A-C source during positive half-cycles and not during negative half-cycles because of the rectifier action of diode 33. Since the core is saturated on alternate half-cycles, the frequency of the modulating pulses is effectively one-half that of A-C voltage source 17. The output frequency of the A-C voltage $E_{DS}$, developed in winding 13 will then be equal to the frequency of the voltage pulses applied on alternate half-cycles of the A-C voltage source 17. That is, the frequency of the output voltage will be, $f_p$, the same as the fundamental frequency of A-C voltage source 17.

Figure 4:
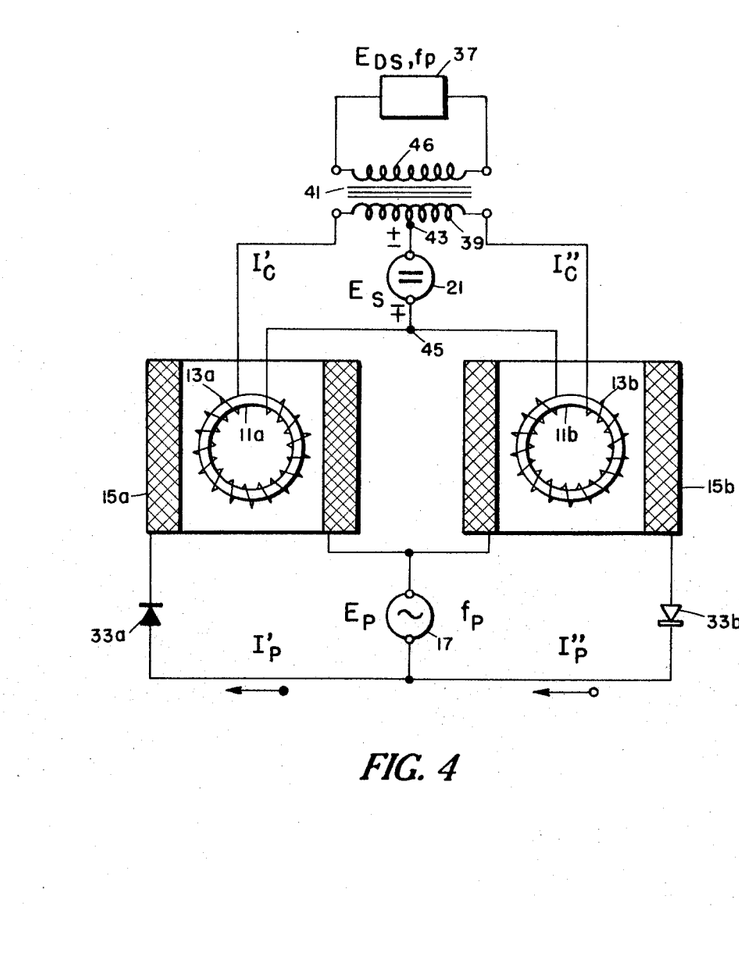
FIG. 4 of the drawings illustrates a full wave fundamental magnetic modulator of this invention.

Referring now to FIG. 4 of the drawings, a fundamental type frequency modulator is illustrated in which two modulator units are employed. Cores 11a and 11b are supplied with windings 13a and 13b respectively. Air core coils 15a and 15b surround cores 11a and 11b respectively. An A-C voltage source 17, having a voltage $E_P$ and a frequency $f_p$, is connected to air core coil 15a through rectifier or diode 33a and to air core coil 15b through rectifier or diode 33b. Windings 13a and 13b are serially interconnected to primary winding 39 of transformer 41. A D-C signal voltage source 21, having a voltage $E_S$, and providing signal currents $I_C'$ and $I_C''$, is connected to windings 13a and 13b at center tap 43 of primary winding 39 and at juncture 45. The secondary winding 46 of transformer 41 is connected to the output on detector circuit 37. With this arrangement, an improvement in the wave form of the fundamental output voltage is obtained. This arrangement further provides a more complete isolation of the D.C. signal voltage from the fundamental frequency output voltage as the alternating output voltage flows through primary winding 39 and does not flow through the path containing D-C signal source 21. The white and black dots on the current arrows and the black and white diodes indicate a particular half-cycle of operation. That is, for example, current $I_P'$ may be flowing through black diode 33a during poistive half-cycles and current $I_P''$ may be flowing through white diode 33b during negative half-cycles of A-C voltage source 17.

Figure 5:
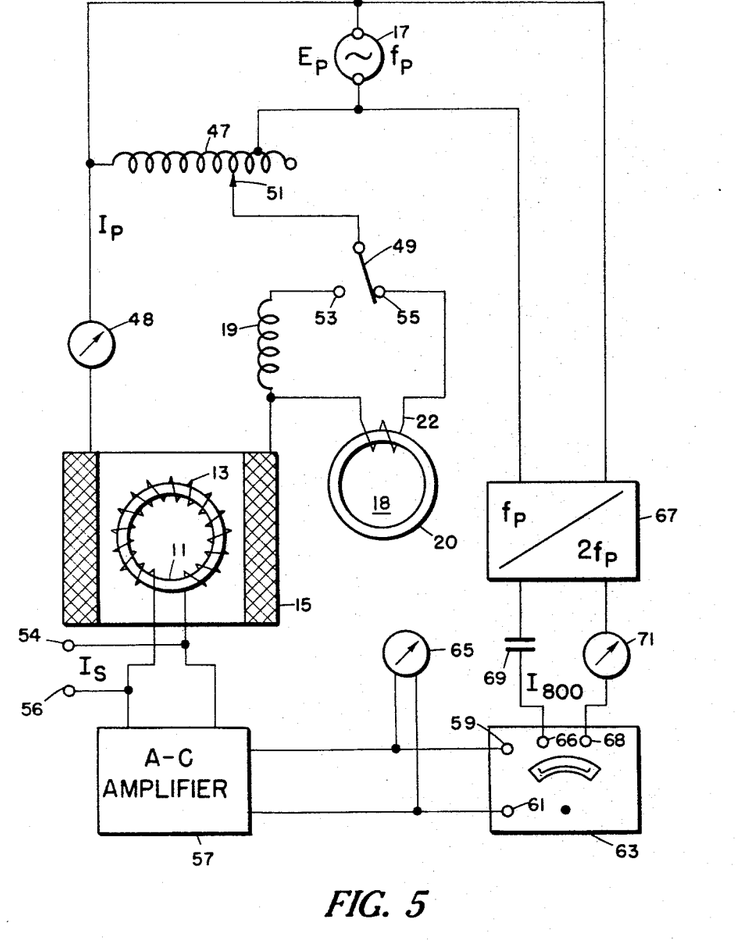
FIG. 5 illustrates a circuit for testing the magnetic modulator of the present invention.

Referring now to FIG. 5 of the drawings in which a circuit is illustrated for testing the performance of the modulator of this invention, a toroidal saturable core 11 is provided with winding 13 and surrounded by air core coil 15. Winding 13 is provided with a signal current $I_S$. Air core coil 15 is energized by A-C voltage source 17 which is connected across the winding of a single winding or auto transformer 47, such as that known in the art as a Variac, for example, A-C voltage source has a voltage $E_P$, a frequency $f_p$ and provides a current flow $I_P$. Air core coil 15 is connected to auto transformer 47 by meter 48 to one terminal of transformer 47 and by switching means 49 through winding 22 of saturating reactor 18 or through linear inductor 19 to moveable tap 51 of transformer 47. Saturating reactor 18 has a toroidal saturable core 20. With the energizing arrangement of FIG. 5, air core coil 15 may be energized by either a sinusoidal current, as is the case when linear inductor 19 is connected into the circuit by switching means 49, or by a pulse or peaked current when saturating reactor is connected into the circuit by switching means 49. A D-C voltage source may be connected to winding 13 at terminals 54 and 56. Winding 13 is also connected to the input circuit of amplifier 57 such that the second harmonic output voltage developed in the modulator may be applied thereto. The output circuit of amplifier 57 is connected to voltage terminals 59 and 61 of wattmeter 63. A voltmeter 65 is connected to the output circuit of amplifier 57.

A-C voltage source 17 is also connected to the input circuit of frequency doubler 67. The output circuit of frequency doubler 67 is connected to the current terminals 66 and 68 of wattmeter 63 through capacitor 69 and meter 71 whereby current $I_{800}$ may flow therethrough. In this circuit, the frequency $f_p$ may be 400 cycles and the frequency $2f_p$ may be 800 cycles.

With the circuit arrangement of FIG. 5 of the drawings, comparison may be made between the input current $I_P$, of A-C voltage source 17, as indicated by meter 48, and the second harmonic output voltage as indicated by meter 65, and as indicated in part by wattmeter 63.

Figure 6:
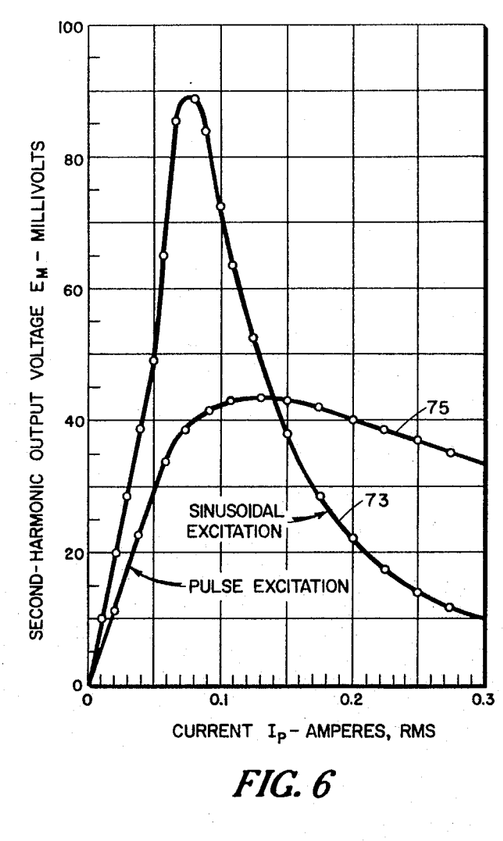
FIG. 6 of the drawings illustrates the relationship between A-C excitation current and second harmonic output voltage for pulse excitation and sinusoidal excitation of a modulator of this invention.

Curve 73 of FIG. 6, shows the relationship between the energizing current $I_P$, in amperes, of air core coil 15, and the second harmonic output voltage $E_M$ in millivolts for the sinusoidal excitation of the modulator. Curve 75 shows this relationship for pulse excitation of the modulator. The sinusoidal excitation is provided in the modulator of FIG. 5 when switch 49 is connected to terminal 53, connecting A-C voltage source 17 to air core coil 15 through linear inductor 19. Pulse excitation is provided when switch 49 is connected to terminal 55, connecting A-C voltage source 17 to air core coil 15 through saturable inductor 18.

Figure 7:
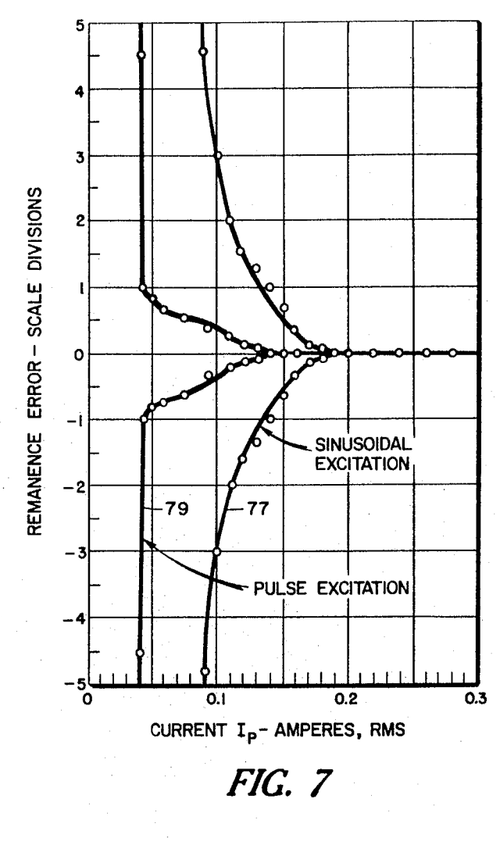
FIG. 7 of the drawings illustrates the relationship between remanence error and A-C excitation current for pulse and sinusoidal excitation of a modulator of this invention.

FIG. 7 of the drawings indicates the remanence error in core 11 when air core coil 15 is energized by various magnitudes of current. Curve 77 indicates the remanence error at various values of energizing current for sinusoidal excitation and curve 79 indicates the remanence error for pulse excitation of air core coil 15.

Figure 8:
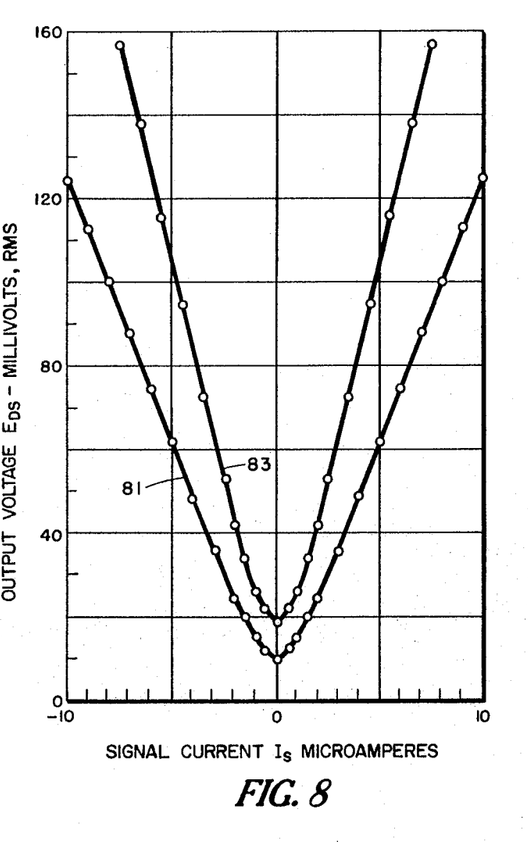
FIG. 8 of the drawings illustrates the relationship between signal current and output voltage for specific input impedance values of a modulator of this invention.

Referring now to FIG. 8 of the drawings, curve 81 indicates the relationship of output voltage to signal current with the impedance of the signal source having a value of 10,000 ohms and curve 83 indicates this relationship with the impedance of the signal circuit having a value of 20,000 ohms. The signal current $I_S$ is in microamperes and the output voltage $E_{DS}$ is in millivolts, root mean square.

Figure 9:
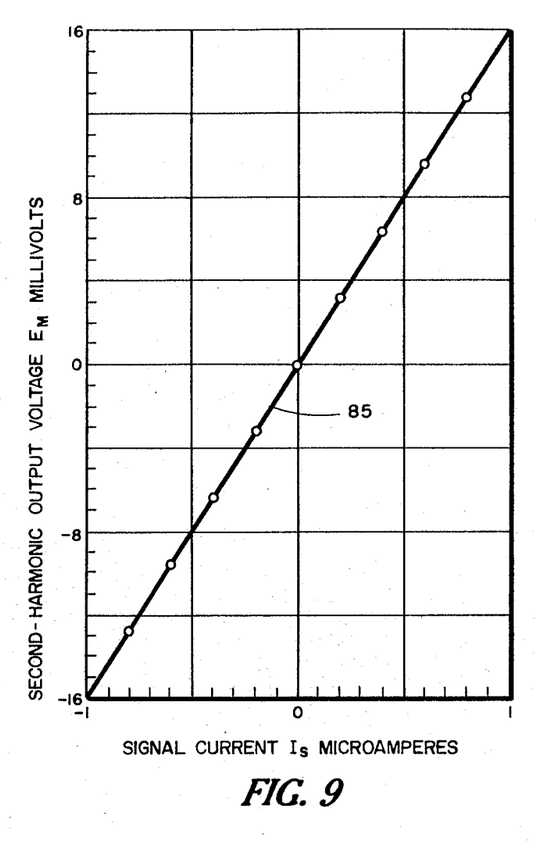
FIG. 9 of the drawings illustrates the relationship between signal current and output voltage for very low signal levels.

Referring now to FIG. 9 of the drawings, curve 85 indicates the relationship of signal current and second harmonic output voltage at very low signal levels. The signal current, $I_S$, is in microamperes and the second harmonic output voltage, $E_{DS}$, is in millivolts, root mean square.

Figure 10:
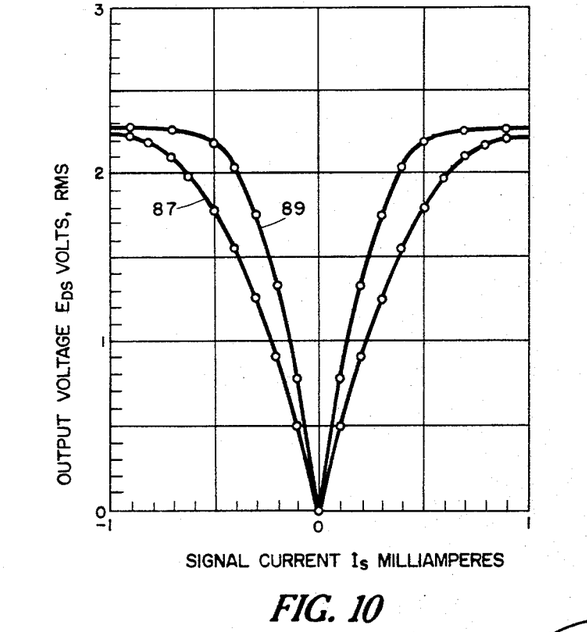
FIG. 10 of the drawings illustrates the relationship between signal current and output voltages for specific input impedances at relatively high positive and negative signal values.

Referring now to FIG. 10 of the drawings, curve 87 indicates the relationship of signal current to output voltage when the impedance of the signal input circuit is 5,000 ohms and curve 89 indicates this relationship when the impedance of the signal input circuit is 10,000 ohms. The input signal current $I_S$ is in milliamperes and the second harmonic output voltage $E_{DS}$ in volts, root mean square.

Figure 11:
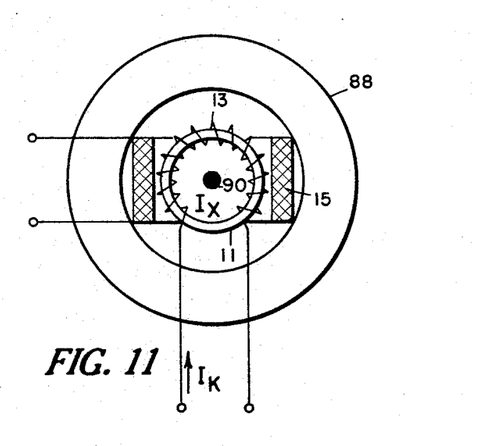
FIG. 11 of the drawings illustrates an embodiment of this invention which may be used for making current measurements.

Referring now to FIG. 11 of the drawings, in which a modulator adapted for current measurements is illustrated, a toroidal core 11 is provided with winding 13 and surrounded by air core coil 15. In addition, a ring-shaped laminated core 88 surrounds A-C excitation coil 15 of the modulator. With this arrangement, a variable direct current $I_X$, flowing in conductor 90, may be measured when a compensating current $I_K$ is flowing in winding 13 and an alternating excitation current is applied to coil 15. Core 88 acting here as a magnetic shield may be a tape-wound nickel-iron-alloy, high permeability ring core, for example.

Figure 12:
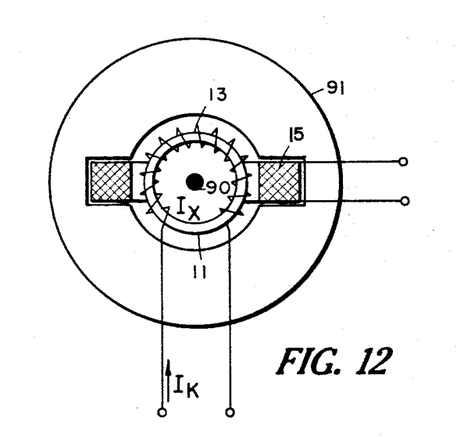
FIG. 12 of this invention illustrates another embodiment of this invention which may be used for making current measurements.

Referring now to FIG. 12 of the drawings, a current measuring device is shown in which a toroidal core 11 has winding 13 wound thereon and an A-C excitation coil 15 surrounding core 11. The A-C excitation coil 15 is recessed within the cutout portions of a ring-shaped, laminated core 91 acting as a high-permeability type of magnetic shield. This toroidal core 91 may be a laminated core, for example. With this arrangement, current $I_X$ flowing through conductor 93 may be measured.

Figure 13:
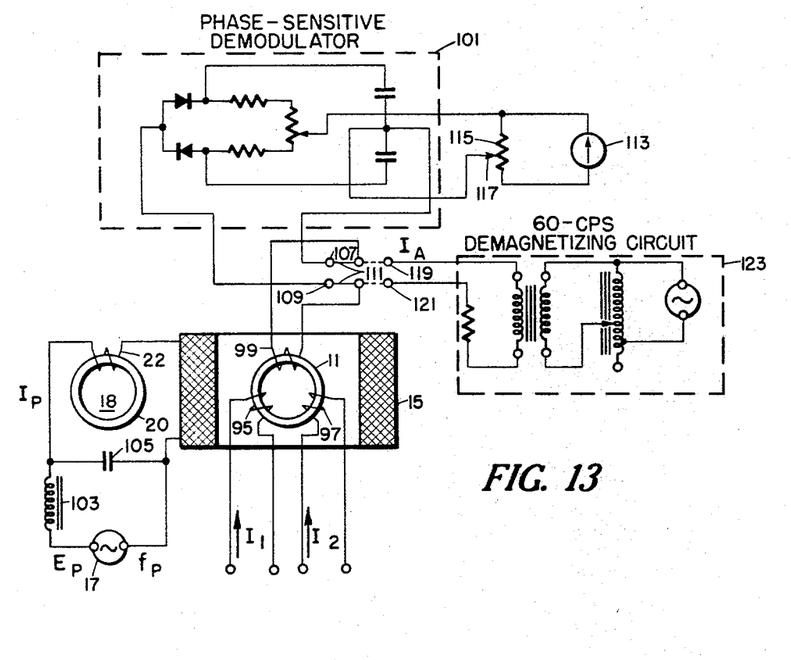
FIG. 13 of this invention illustrates an embodiment of a modulator of this invention in which comparisons of two currents may be made.

Referring now to FIG. 13 of the drawings in which a magnetic modulator employed as a direct-current comparator is shown, a saturable toroidal core 11 is provided with a first D-C control winding 95 to which a direct current $I_1$ may be applied and a second D-C control winding 97 to which a direct current $I_2$ may be applied. An output winding 99 may be connected to phase sensitive demodulator 101. An air core coil or solenoid 15 which surrounds core 11 may be connected to a source of A-C voltage 17 through a ferroresonant circuit including a linear inductor 103, a saturable reactor 18 and capacitor 105. Saturable reactor 18 has a core 20 and a winding 22. Secondary winding 99 may be connected to terminals 107 and 109 of phase sensitive demodulator 101 through switch 111. The output of phase sensitive demodulator 101 may be connected to meter 113 through potentiometer 115 having moveable tap 117. Secondary winding 99 may also be connected to terminals 119 and 121 of a 60 cycle demagnetizing circuit 123.

Figure 14:
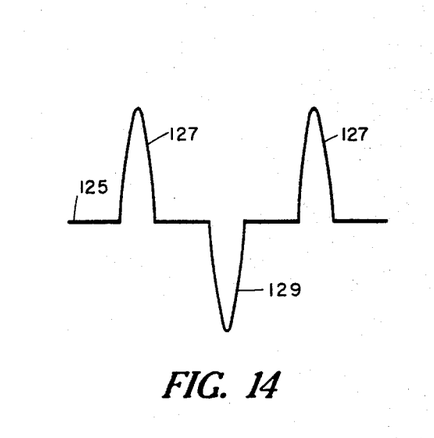
FIG. 14 of this invention illustrates a wave form of the pulse excitation used in an embodiment of this invention.

Referring now to FIG. 14 of the drawings in which a representation of the oscillograph current wave form 125 applied to the A-C excitation coil 15 by the ferroresonant circuit is illustrated, it may be seen that the actual current pulses having positive peaks 127 and negative peak 129 have a duration of approximately half the duration of the positive and negative half-cycle portions of the A-C supply voltage source 17.

Figure 15:
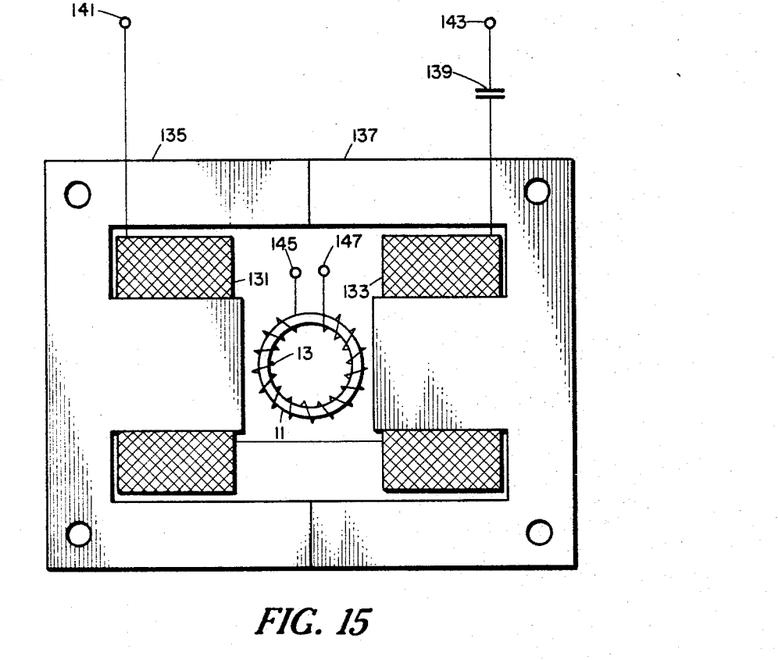
FIG. 15 of the drawings illustrates an embodiment of the modulator of this invention in which a laminated core surrounds the toroidal core of the modulator.

Referring now to FIG. 15 of the drawings, a modulator is illustrated in which core 11 having a winding 13 is surrounded by windings 131 and 133 which are wound on cores 135 and 137 respectively. Cores 135 and 137 may be made up of transformer core type laminations. Windings 131 and 133 are serially connected through capacitor 139 to terminals 141 and 143. Terminals 141 and 143 may be connected to an A-C voltage source directly or through a ferroresonant circuit. Terminals 145 and 147 of winding 13 may be connected to a D-C signal source and to second harmonic output circuit which may include a phase sensitive demodulator.

Figure 16:
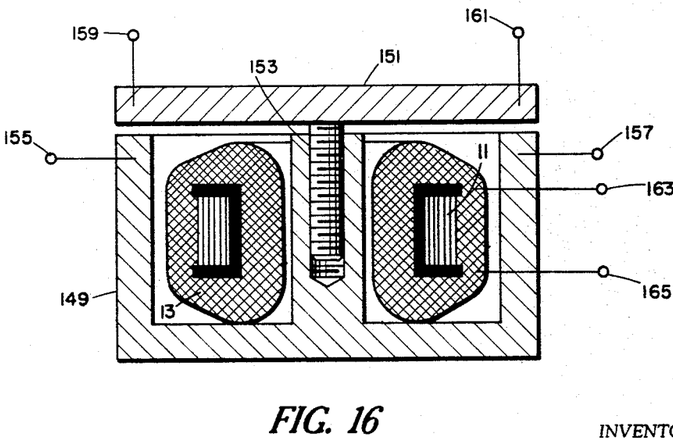
FIG. 16 of this invention illustrates a toroidal core arrangement which is placed within a metallic enclosure.

Referring now to FIG. 16 of the drawings a modulator core structure is shown in cross-section in which a core 11 having a toroidal winding 13 wound thereon in which the core 11 is surrounded by a cup shape metallic casing 149 having a top 151 which may be fastened to casing 149 by threaded bolt 153. Terminals 155 and 157 of the casing and terminals 159 and 161 of the top 151 may be connected in parallel to a source of D-C signal voltage. Additional connection to the casing at desired intervals around the periphery of casing 149 may be made as needed. Metallic casing 149 and top 151 thus serve as a single turn winding about core 11 which provides an even distribution of current flow along the circumference of the core. Terminals 163 and 165 of the winding 13 may be connected to a second harmonic output circuit. The metallic casing, 149 which may be made of copper, for example, is to be placed within an air core coil or other means to produce an A-C magnetic field, as described before.

The saturable toroidal core used in the modulator of this invention may be a molybdenum-permalloy tape wound bobbin core with a tape thickness of ⅛ mil and a tape width of ⅛ inch. The core has approximately the size of a wedding ring.

The A-C power level or ampere turn level applied to the A-C excitation coil is limited by the rate of heat dissipation within the coil. The use of pulse type excitation as shown in FIG. 14 makes it possible to increase the peak excitation current $I_p$ without increasing the heat dissipation in the coils. In fact that ratio of the peak current to the root mean square value of current ranges between about 2.5 to 1 and 3 to 1 as compared to normal sinusoidal excitation in which the ratio of peak current to the root mean square value is 1.41. The air core coil of the modulator may be energized by a 400 cycle A-C voltage source in which case the frequency of the second harmonic voltage is 800 cycles.

The modulator of this invention has been used also as a high precision direct-current comparator with a 400 cycle supply and operated at levels of 1 to 10 ampere turns. Such a design as shown in FIG. 13, for example may be used in measuring current ratios in the range from 2:1 to 1000:1, with accuracies of 5 to 50 parts per million.

The residual noise output appearing across the winding on the toroidal core may be minimized by adjusting the angular position of the toroidal core within the air core coil or solenoid. On the other hand, when using a peak rectifier type of phase sensitive demodulator, used in the circuit of FIG. 13, for example, the required asymmetry between the two magnetic paths of the core structure may be introduced by changing the angular position of the toroidal core with respect to the air core such that maximum sensitivity of the detector system is obtained.

A major problem in the design of magnetic modulators is the elimination of disturbing effects of capacitive currents. In the single toroidal core magnetic modulator of this invention, however, the relatively large distance between the winding on the toroidal core and the winding of the A-C excitation coil eliminates the disturbing effects created by capacitive currents between these windings and eliminates the need for electrostatic shielding of these windings.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A magnetic modulator circuit having a second harmonic output voltage magnitude proportional to the magnitude of an input signal comprising,
    a toroidal saturable core,
    a winding on said core,
    means providing an A-C magnetic field encompassing said core for alternately saturating said core in first and second flux directions,
    a D-C signal voltage input circuit,
    means connecting said D-C signal voltage input circuit to said winding,
    a phase sensitive detector having input terminals and output terminals,
    a meter,
    a second harmonic output circuit comprising said phase sensitive detector, means connecting the input terminals of said phase sensitive detector to the winding on said saturable core, and means connecting the output terminals of said phase sensitive detector to said meter.

2. A magnetic modulator as in claim 1 in which said signal voltage input circuit has a low impedance.

3. A magnetic modulator as in claim 1 in which said signal voltage input circuit has a high impedance.

4. A magnetic modulator as in claim 1 in which said means providing an A-C magnetic field includes an air core coil surrounding said saturable core and means for connecting said air core coil to an A-C voltage source.

5. A magnetic modulator as in claim 4 in which said means for connecting said air core coil to an A-C voltage source is a linear inductor.

6. A magnetic modulator as in claim 4 in which said means for connecting said air core coil to a source of A-C voltage is a saturable reactor whereby peak pulses of current may be applied to said air core coil to reduce the heat dissipation of said air core coil.

7. A fundamental frequency magnetic modulator comprising,
    a first saturable toroidal core,
    a first winding on said first core,
    a second saturable toroidal core,
    a second winding on said second core,
    a first air core coil surrounding said first saturable toroidal core,
    a second air core coil surrounding said second saturable toroidal core,
    an A-C voltage input circuit,
    a first rectifier means connecting said first coil to said A-C voltage input circuit, said first rectifier means poled to conduct during positive half-cycles of an A-C voltage source,
    a second rectifier means connecting said second coil to said A-C voltage input circuit, said second rectifier means poled to conduct during negative half-cycles of an A-C voltage source,
    a signal voltage input circuit,
    means connecting said first and second windings in parallel to said signal voltage input circuit,
    a fundamental frequency output circuit,
    means serially connecting said first and second windings to said output circuit.

References Cited

UNITED STATES PATENTS

| 2,446,939 | 8/1948 | MacCallum | 324—43 |
| 2,585,654 | 2/1952 | Hewlette | 332—51 |
| 2,883,605 | 4/1959 | Mortimer | 321—68 |
| 3,041,535 | 6/1962 | Cochran | 324—118 |

RUDOLPH V. ROLINEC, *Primary Examiner.*

J. J. MULROONEY, *Assistant Examiner.*